(12) United States Patent
Henry et al.

(10) Patent No.: US 8,746,626 B1
(45) Date of Patent: Jun. 10, 2014

(54) ADAPTIVE STRUCTURAL CORE FOR MORPHING PANEL STRUCTURES

(75) Inventors: Christopher P. Henry, Thousand Oaks, CA (US); Geoffrey P. McKnight, Los Angeles, CA (US); Sloan P. Smith, Calabasas, CA (US)

(73) Assignee: The Boeing Company, Chicago, IL (US)

( * ) Notice: Subject to any disclaimer, the term of this patent is extended or adjusted under 35 U.S.C. 154(b) by 304 days.

(21) Appl. No.: 12/699,285

(22) Filed: Feb. 3, 2010

Related U.S. Application Data

(60) Provisional application No. 61/260,950, filed on Nov. 13, 2009.

(51) Int. Cl.
*B64C 3/44* (2006.01)
*B64C 3/52* (2006.01)

(52) U.S. Cl.
USPC .................. 244/219; 244/129.1; 244/218

(58) Field of Classification Search
USPC .............. 244/99.8, 99.3, 99.11, 99.13, 129.1, 244/132, 218, 219; 428/72, 73, 116–118, 428/593; 310/328–333
See application file for complete search history.

(56) References Cited

U.S. PATENT DOCUMENTS

| | | | |
|---|---|---|---|
| 3,118,639 A * | 1/1964 | Kiceniuk | 244/219 |
| 5,662,294 A | 9/1997 | Maclean | |
| 6,946,180 B2 | 9/2005 | Hawkins | |
| 7,598,651 B2 | 10/2009 | Kornbluh et al. | |
| 7,607,617 B2 | 10/2009 | Law | |
| 7,901,524 B1 * | 3/2011 | McKnight et al. | 148/563 |
| 7,931,240 B2 | 4/2011 | Kothera et al. | |
| 2006/0118675 A1 | 6/2006 | Tidwell | |
| 2006/0145030 A1 * | 7/2006 | Cowan et al. | 244/219 |
| 2006/0192465 A1 | 8/2006 | Kornbluh | |
| 2006/0226291 A1 * | 10/2006 | Law | 244/123.7 |
| 2007/0138341 A1 | 6/2007 | Joshi | |
| 2008/0035788 A1 | 2/2008 | Kothera et al. | |

FOREIGN PATENT DOCUMENTS

| | | |
|---|---|---|
| DE | 19709917 C1 | 4/1998 |
| DE | 102004063093 A1 | 7/2006 |
| WO | WO 2010/049837 | 12/2010 |
| WO | 2011059571 A1 | 5/2011 |

OTHER PUBLICATIONS

PCT search report dated Dec. 2, 2010 regarding application PCT/US2010/0R9837, applicant The Boeing Company, 12 Pages.
Li et al., "A Variable Transverse Stiffness Sandwich Structure Using Fluidic Flexible Matrix Composite (F2MC)," Proc. of SPIE, vol. 6928, 2008, 12 pages.
Philen et al., "Fluidic Flexible Matrix Composites for the Tailoring of Variable Stiffness Adaptive Structures," 48th AIAA/ASME/ASCE/AHS/ASC Structures, Structural Dynamics, and Materials Conference, Apr. 2007, 11 pages.

(Continued)

*Primary Examiner* — Timothy D Collins
*Assistant Examiner* — Brian M O'Hara
(74) *Attorney, Agent, or Firm* — Yee & Associates, P.C.

(57) ABSTRACT

An adaptive structural core includes a plurality of core members arranged in a repeating pattern, a plurality of actuator attachment points provided on the plurality of core members and at least one actuator engaging the plurality of actuator attachment points.

28 Claims, 8 Drawing Sheets

(56) References Cited

OTHER PUBLICATIONS

Philen et al., "Variable Stiffness Adaptive Structures Utilizing Hydraulically Pressurized Flexible Matrix Composites with Valve Control," 47th AIAA/ASME/ASCE/AHS/ASC Structures, Structural Dynamics, and Materials Conference, May 2006, 11 pages.

Skelton et al., "An Introduction to the Mechanics of Tensegrity Structures," In: Dynamics and Control of Aerospace Systems, Skelton (Ed.), CRC Press LLC, Boca Raton, FL, 2002, 75 pages.

Li, S., Amir Loft, Ying Shan, K.W. Wang, Christopher D. Rahn, Charles E. Bakis, "A variable transverse stiffness sandwich structure using fluidic flexible matrix composite (F2MC)," Proc. of SPIE vol. 6928, (2008).

Michael, Philen, Ying Shan, C.E. Bakis, K.W. Wang, C.D. Rahn, "Variable Stiffness Adaptive Structures ulitizing Hydraulically Pressurized Flexible Matrix Composites with Valve Control," $47^{th}$ AIAA/ASME/ASCE/AHS/ASC Structures, Structural Dynamics, and Materials Conference, AIAA 2006-2134, 2006.

Michael Philen, Ying Shan, K.W. Wang, C.E. Bakis, C.D. Rahn, "Fluidic Flexible Matrix Composites for the Tailoring of Variable Stiffness Adaptive Structures," $48^{th}$ AIAA/ASME/AHS/ASC Structures, Structural Dynamics, and Materials Conference, AIAA 2007-1703, 2007.

Skelton, R.E., "Chapter 17: An Introduction to the Mechanics of Tensegrity Structures," Dynamics and Control of Aerospace Systems, CRC 2002.

\* cited by examiner

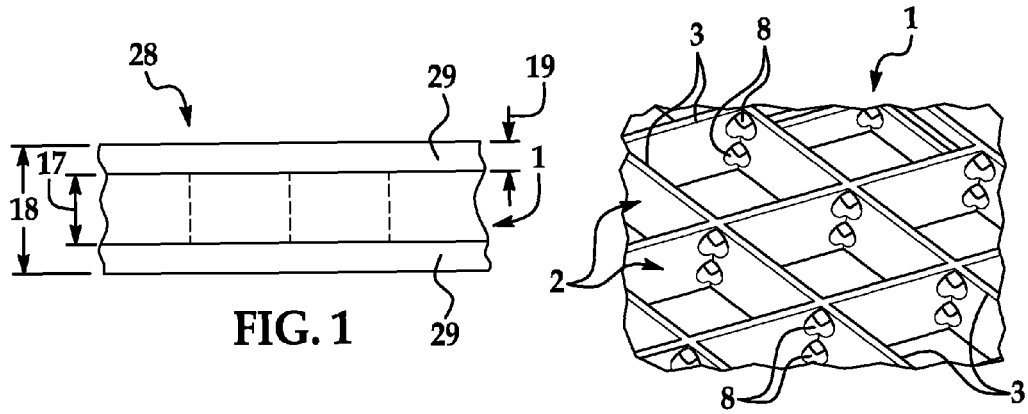
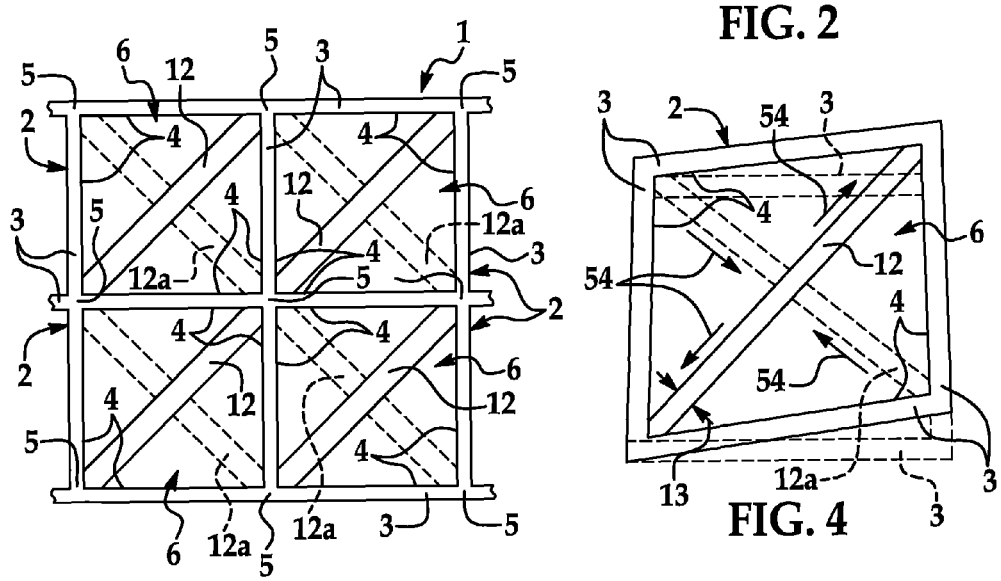
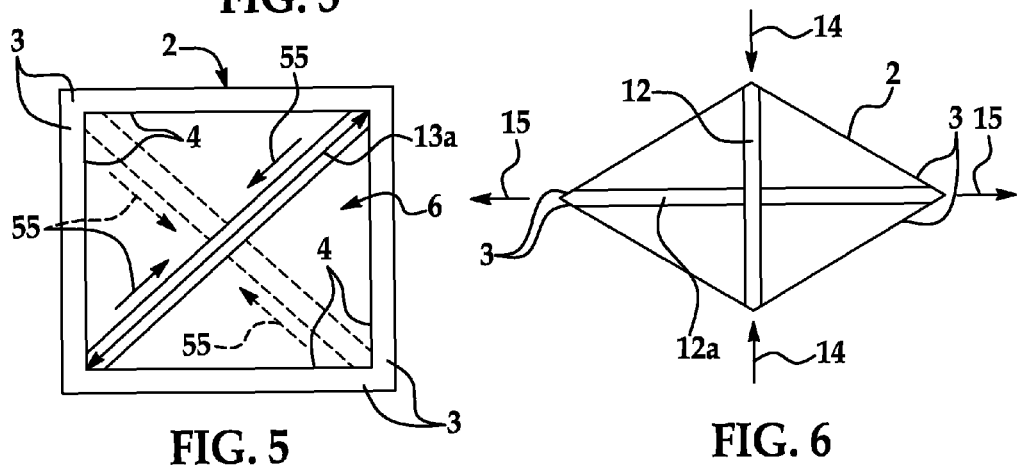

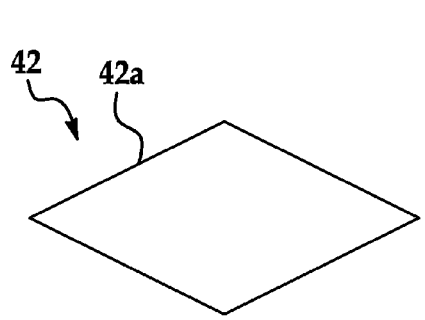
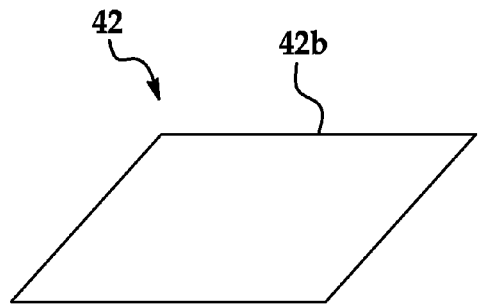
FIG. 6A    FIG. 6B
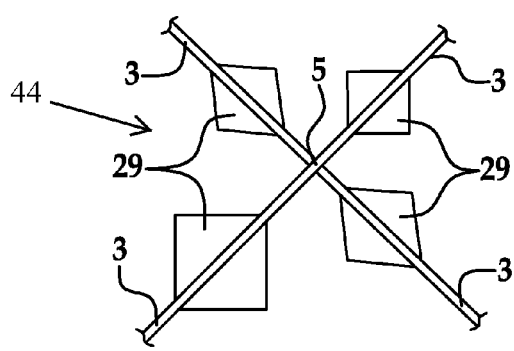
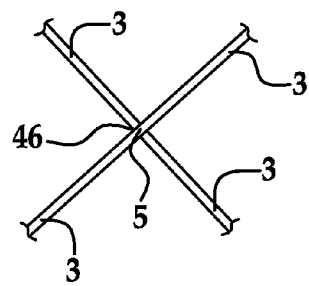
FIG. 6C    FIG. 6D
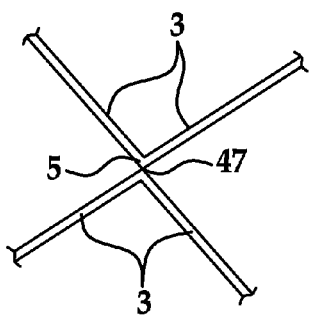
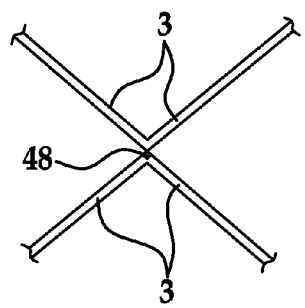
FIG. 6E    FIG. 6F

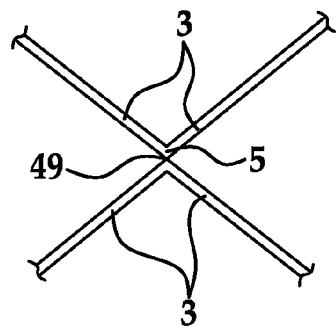
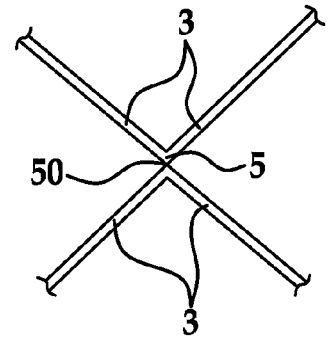
FIG. 6G  FIG. 6H
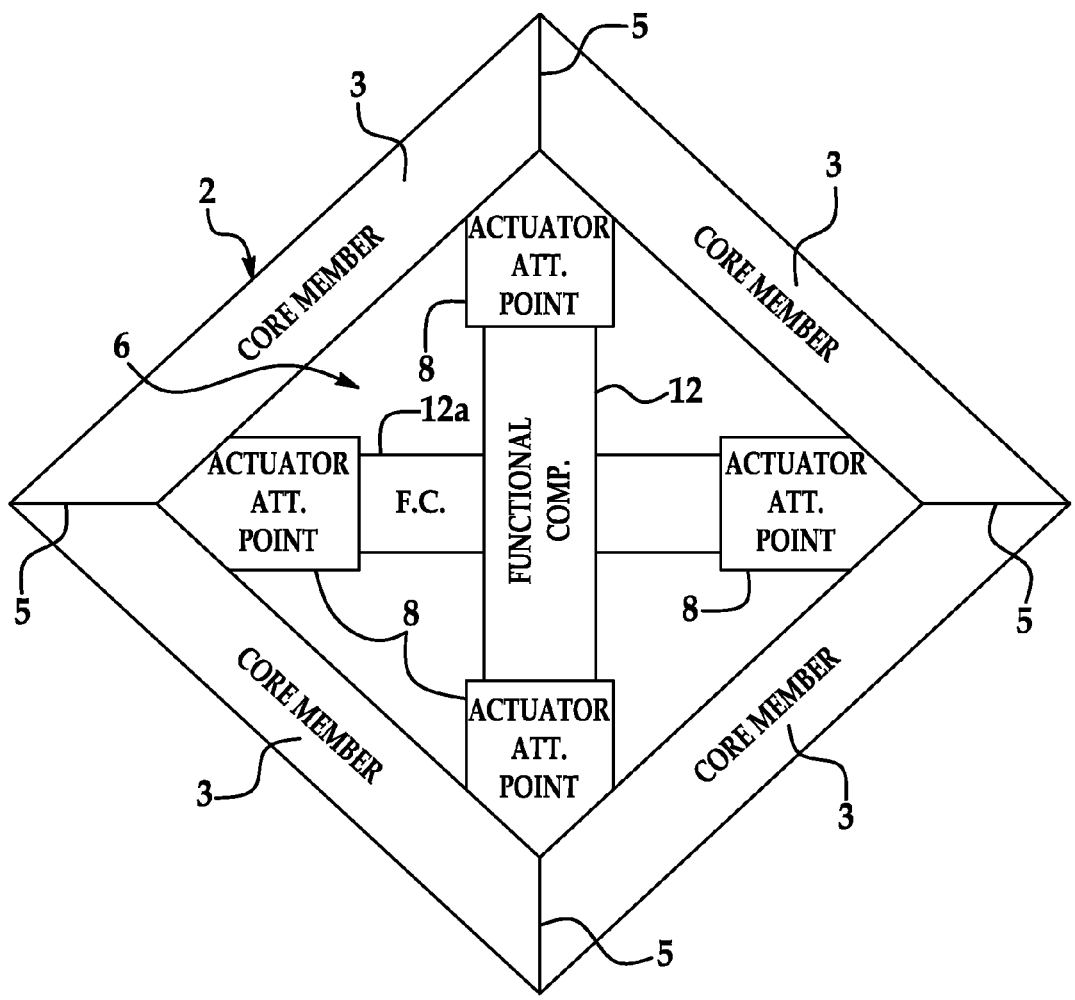
FIG. 6I

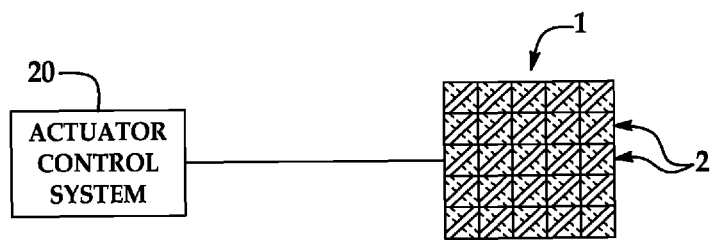
FIG. 7
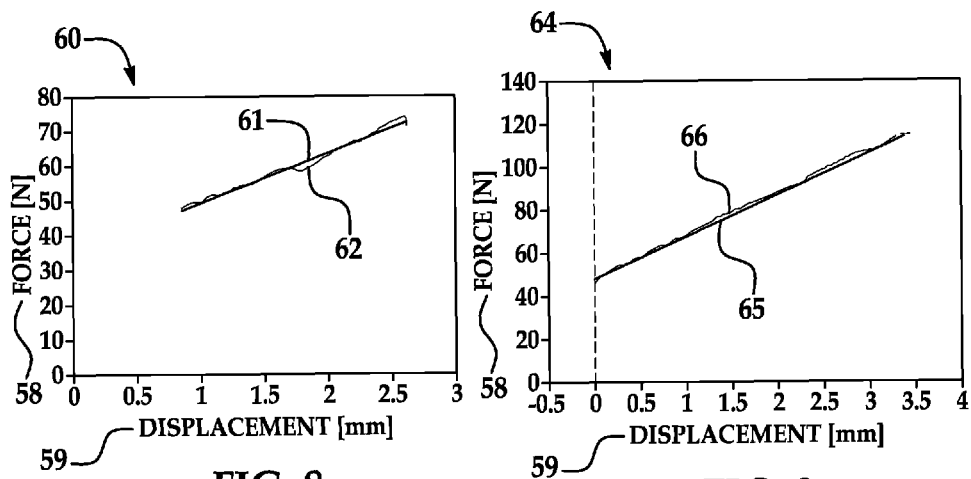
FIG. 8
FIG. 9
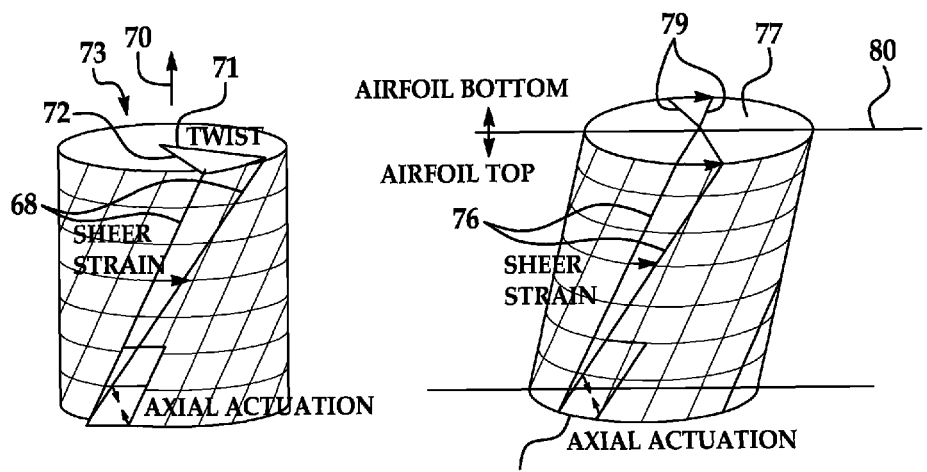
FIG. 10
FIG. 11

US 8,746,626 B1

ADAPTIVE STRUCTURAL CORE FOR MORPHING PANEL STRUCTURES

CROSS-REFERENCE TO RELATED APPLICATIONS

This application claims the benefit of and incorporates by reference in its entirety U.S. Provisional application No. 61/260,950, filed Nov. 13, 2009 and entitled "ADAPTIVE STRUCTURAL CORE FOR MORPHING COMPONENTS".

TECHNICAL FIELD

The disclosure relates to morphing panel structures which are suitable for aerodynamic applications. More particularly, the disclosure relates to an adaptive structural core for morphing panel structures which are suitable for aerospace and other applications.

BACKGROUND

Morphing panel structures may be useful in aerodynamic applications in which large pressure and temperature gradients or loads may be applied to an airfoil or other surface. The aerodynamic functionality of morphing panel structures may require a delicate balance between the flexibility and the structural support capabilities of the structures. Therefore, it may be desirable that morphing panel structures which are suitable for aerospace applications be resistant to out-of-plane bending or flexing deformation while remaining amenable to in-plane deformation.

An adaptive structural core for a morphing panel structure is needed to facilitate resistance of the structure to out-of-plane bending or flexing deformation while enabling in-plane deformation of the structure.

SUMMARY

The disclosure is generally directed to an adaptive structural core for morphing panel structures which facilitates resistance of the structure to out-of-plane bending or flexing deformation while enabling in-plane deformation of the structure. An illustrative embodiment of the adaptive structural core includes a plurality of core members arranged in a repeating pattern, a plurality of actuator attachment points provided on the plurality of core members and at least one actuator engaging the plurality of actuator attachment points.

In some embodiments, the adaptive structural core may include a plurality of core members arranged in a repeating pattern of core cells each having a cell space; a plurality of actuator attachment points provided on the plurality of core members in the cell space; a first actuator provided in the cell space and engaging a first pair of the plurality of actuator attachment points; and a second actuator provided in the cell space and engaging a second pair of the plurality of actuator attachment points.

The disclosure is further generally directed to an adaptive structural core method. An illustrative embodiment of the method includes providing a plurality of core members, arranging the plurality of core members in a repeating pattern and providing a plurality of actuator attachment points on the plurality of core members.

In some embodiments, the adaptive structural core for morphing panel structures may include plurality of intersecting core members arranged in a planar repeat pattern of core cells each having a cell space and a plurality of cell walls facing the cell space; a plurality of actuator attachment openings provided in the plurality of core members in the cell space; a first actuator provided diagonally in the cell space and engaging a first pair of the plurality of actuator attachment points; and a second actuator provided diagonally in the cell space and engaging a second pair of the plurality of actuator attachment points. Each of the first actuator and the second actuator adapted to exert forces on the cell walls in a selected one of a cooperative manner and an antagonistic manner.

In some embodiments, the adaptive structural core method may include providing a plurality of core members; forming an adaptive structural core by arranging the plurality of core members in a repeating pattern; providing a plurality of actuator attachment points on the plurality of core members; providing a plurality of actuators; attaching the actuators to the actuator attachment points on the core members; providing at least one composite facesheet on the plurality of core members; changing a shape of the adaptive structural core by operating the actuators in a cooperative manner; and stiffening the adaptive structural core by operating the actuators in an antagonistic manner.

The disclosure is further generally directed to a method of adapting a structural core of a morphing panel structure. An illustrative embodiment of the method includes providing an adaptive structural core having a plurality of core cells, providing at least one actuator in the core cells of the adaptive structural core and adapting the adaptive structural core by actuation of the at least one actuator.

BRIEF DESCRIPTION OF THE ILLUSTRATIONS

FIG. 1 is an illustration of a sectional view of a morphing panel structure which utilizes an embodiment of the adaptive structural core.

FIG. 2 is an illustration of a perspective view, partially in section, of an embodiment of the adaptive structural core, with actuator attachment points provided in each of multiple core cells in the core.

FIG. 3 is an illustration of a top view of a section of an embodiment of the adaptive structural core, more particularly illustrating an exemplary orientation of actuators, one of which is shown in solid lines and the other of which is shown in phantom lines, in each of multiple core cells of the adaptive structural core.

FIG. 4 is an illustration of a top view of a core cell of an embodiment of the adaptive structural core, more particularly illustrating operation of the actuators in a cooperative manner to effect a change in shape of the core.

FIG. 5 is an illustration of a top view of a core cell of an embodiment of the adaptive structural core, more particularly illustrating operation of the actuators in an antagonistic manner to effect stiffening of the core.

FIG. 6 is an illustration of a schematic diagram which illustrates stress and strain imparted to each core cell of an embodiment of the adaptive structural core by the actuators in each core cell.

FIG. 6A is a diagram illustrating a rhombus geometry of a planar repeat structure of the adaptive structural core.

FIG. 6B is a diagram illustrating a parallelogram geometry of a planar repeat structure of the adaptive structural core.

FIG. 6C is an illustration of a top sectional view of a pair of core members arranged in a wine bottle case configuration.

FIG. 6D is an illustration of a top sectional view of a pair of core members attached to each other in an interlocking configuration.

FIG. 6E is an illustration of a top sectional view of a pair of core members adhered to each other.

FIG. 6F is an illustration of a top sectional view of a pair of core members attached to each other via welding.

FIG. 6G is an illustration of a top sectional view of a pair of core members attached to each other via bonding.

FIG. 6H is an illustration of a top sectional view of a pair of core members attached to each other via brazing.

FIG. 6I is an illustration of a block diagram of a core cell of an embodiment of the adaptive structural core.

FIG. 7 is an illustration of a schematic diagram which illustrates an actuator control system connected to an embodiment of the adaptive structural core.

FIG. 8 is an illustration of a line graph which illustrates differential pressurization of a first actuator at 125 psi vs. pressurization of a second actuator at −10 psi, yielding a stiffness of 13.9 N/mm.

FIG. 9 is an illustration of a line graph which illustrates differential pressurization of a first actuator at 125 psi vs. pressurization of a second actuator at 125 psi, yielding a stiffness of 19.4 N/mm.

FIG. 10 is an illustration of a diagram which illustrates differential in-plane twisting deformation capability of an embodiment of a morphing panel structure of which the adaptive structural core is a part.

FIG. 11 is an illustration of a diagram which illustrates differential in-plane shear deformation capability of an embodiment of a morphing panel structure of which the adaptive structural core is a part.

DETAILED DESCRIPTION

Figure 12:
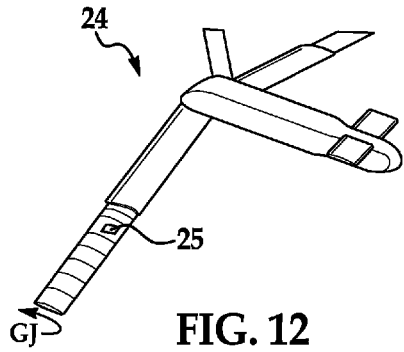
FIG. 12 is an illustration of a perspective view of an exemplary aircraft with an aircraft skin which utilizes an embodiment of the adaptive structural core.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Referring initially to FIGS. 1-7, an illustrative embodiment of the adaptive structural core for morphing panel structures, hereinafter adaptive structural core, is generally indicated by reference numeral 1. As shown in FIG. 1, in some applications the adaptive structural core 1 may be part of a morphing panel structure 28. As will be hereinafter described, the adaptive structural core 1 may be adapted to impart stiffness or changes in shape to the morphing panel structure 28. At least one composite facesheet 29 may be provided on the adaptive structural core 1. In some embodiments, the adaptive structural core may be sandwiched between a pair of the composite facesheets 29, as shown in FIG. 1. The morphing panel structure 28 may be amenable to a variety of applications. In some applications, the morphing panel structure 28 may be part of an aircraft wing skin 40 (FIG. 19) of an aircraft 94. The morphing panel structure 28 may be amenable to other applications including but not limited to winglets, bay doors, resizable compartments, stabilizers, control surfaces and turbine inlet and outlet nozzles, as well as non-aerospace applications.

As shown in FIGS. 2 and 3, the adaptive structural core 1 may include multiple core members 3 which may be a metallic or composite material, for example and without limitation. In some embodiments, the adaptive structural core 1 may be constructed in a web configuration in which the core members 3 intersect at core member junctions 5 (FIG. 3). As shown in FIGS. 6A and 6B, the adaptive structural core 1 may include a planar repeat unit structure 42 in a rhombus 42a (FIG. 6A) or parallelogram 42b (FIG. 6b) geometry. Multiple core cells 2, each having a cell space 6, may be defined by and between the intersecting core members 3. The core members 3 may have core walls 4 which face the core space 6 of each core cell 2.

The core members 3 may be made with a series of stacked layers or even weaves or as a series of expanded strips that are bonded in narrow, periodic locations along the strips. As shown in FIG. 6C, in some embodiments, the core members 3 may be constructed as a "wine case partition" 44 (vertically interleaved strips). The core members 3 may be interlocked 46 (FIG. 6D), adhered 47 (FIG. 6E), welded 48 (FIG. 6F), bonded 49 (FIG. 6G), brazed 50 (FIG. 6H) and/or otherwise attached to each other. The adaptive structural core 1 may be made as a monolith or in assemble-able portions from metal alloys or composite materials, for example and without limitation, via machining, laser cutting, water jet cutting, EDM or etching, for example and without limitation. For composite core members 3, laser cutting or water jet cutting may be used to cut the strips or the core monolith. Various existing weave lay-ups and resin infiltration techniques may be used for making miniature core webs or assemble-able parts of the core structure.

As shown in FIGS. 2 and 6I, in some embodiments, actuator attachment points 8 may be provided in the core members 3 to facilitate attachment of actuators 12, 12a and/or sensors, electrical wiring or other functional components (not shown) to the core members 3 to provide a mechanical connection between those components and the adaptive structural core 1. In some embodiments, the actuator attachment points 8 may be openings provided in the core members 3, as shown in FIG. 2. In some embodiments, a first actuator 12 may be oriented in a first diagonal orientation within the cell space 6 of each core cell 2. A second actuator 12a may be oriented in a second diagonal orientation within the cell space 6 of each core cell 2 in intersecting relationship with respect to the first actuator 12. In other embodiments, alternative orientations for the actuators 12, 12a may be possible.

In some embodiments, the actuators 12, 12a may be, without limitation, shape memory NiTI alloy wire; magnetostrictive Galfenol rods, miniaturized pneumatic or hydraulic McKibben actuators, miniaturized ultrasonic piezoelectric motors or electrostrictive PVDF polymer strips. Each actuator 12, 12a may be discrete or continuous with respect to the control/motive force signal. To aid in construction, reduce control complexity and reduce mass and volume, the actuators 12, 12a may be continuous across many core cells 2 in the adaptive structural core 1. For example and without limitation, the actuator attachment points 8 (FIG. 2) may be holes or gaps made at the nodal locations or other locations along the core members 3 without affecting the shear strength of the adaptive structural core 1 for actuator insertion, sensors or electronic wiring. In some embodiments, McKibben actuators 12 may be assembled into actuator attachment points 8 at the core nodes 5 such that a mechanical connection is made with the adaptive structural core 1 but the tubing (not shown) of each actuator 12, 12a is continuous through the actuator attachment points 8 so that the actuator 12, 12a can move fluid. Pneumatic or hydraulic McKibben actuators 12, 12a or non-hydraulic actuators 12, 12a, for example and without limitation, may be fluidically continuous along many core cells 2 in a single row (or actuator orientation), multiple rows or even continuous between rows and columns of the adaptive structural core 1 (both actuator orientations). This may enable remoting of fluidic valving (not shown) and distribution manifold (not shown). After installation of the actuators 12, 12a and/or other components, the composite facesheets 29 may be attached to the adaptive structural core 1 by bonding, welding, brazing and/or other attachment techniques to fabricate the morphing panel structure 28 (FIG. 1).

The actuators 12, 12a may be operated via a gas or an incompressible or substantially incompressible hydraulic working fluid. In some embodiments, strain sensors (not shown) may be embedded in the composite facesheets 29 of the morphing panel structure 28 (FIG. 1). The strain sensors may feedback into control software of the actuator control system 20 (FIG. 7) and may be used to control the valve and pump hydraulic control actuators.

The actuators 12, 12a may be distributed among the core cells 2 of the adaptive structural core 1 in such a manner as to optimize different performance values such as stiffness, displacement, mass, control authority energy, fabrication ease, etc. As shown in FIG. 7, in some embodiments a remote actuator control system 20 may be connected to each of the actuators 12, 12a (FIG. 6). By designing the connectivity appropriately from the actuator control system 20 to the distributed actuators 12, 12a, differential control between the actuators 12, 12a may be possible. This differential control may include operation of the actuators 12, 12a in different orientations, spatial regions (inboard vs. outboard wing locations or trailing edge vs. leading edge wing locations) or different actuator states (initial position, remaining service life, etc.). When the actuators 12, 12a are connected and operated in different orientations within a core cell 2, a cooperative configuration can be realized to change the shape of the core cells 2, as shown in FIG. 4, in which the original shape of a core cell 2 is shown in phantom lines and the changed shape is shown in solid lines. Alternatively, the actuators 12, 12a can be operated in an antagonistic configuration to stiffen the core cells 2, as shown in FIG. 5. When the actuators 12, 12a are operated in the antagonistic configuration shown in FIG. 4, the shape of the core cells 2 may remain the same while the core members 3 of each core cell 2 may stiffen.

In FIG. 6, a schematic diagram which illustrates stress 14 and strain 15 imparted to each core cell 2 of an illustrative embodiment of the adaptive structural core 1 by the actuators 12, 12a in each core cell 2 is shown. The core cell 2 may be designed such that the actuators 12, 12a are attached in a position to reinforce a compliant direction 14, 15 of the adaptive structural core 1. When the actuators 12, 12a in different orientations are activated in a cooperative manner 54 (such as push-pull 54), as shown in FIG. 4, the deformation mechanism 14, 15 may cause the core cells 2 and the adaptive structural core 1 (FIG. 3) to change shape. Conversely, when the actuators 12, 12a are activated in an antagonistic manner 55 (such as pull-pull 55), as shown in FIG. 5, the deformation mechanism 14, 15 may be blocked due to the competing actions of the actuators 12, 12a, stiffening the adaptive structural core 1.

Geometry definitions of the antagonistically-actuated core unit cell geometry with four static, compressive members (C4) forming a rhombus 42a (FIG. 6A) or parallelogram 42b (FIG. 6B) and two tensile actuating members (T2) that diagonally cross the parallelogram may be expressed by equation (I), equation (II) and equation (II) below. In tensegrity nomenclature, this configuration is known as C4T2. Other tensegrity forms may be appropriate for planar actuation schemes. Equation (I) is a stress equation which represents the cross-sectional area normalized force generated by each actuator 12, 12a according to the actuator design variables. Equation (II) represents the kinematic strain in the 1-direction based on the core design variables.

$$\sigma_{mcKibben1} = (P + \delta P)[3/\tan^2(\alpha_{10})(1 - K\epsilon)^2 - 1/\sin^2(\alpha_{10})] \quad \text{Equation 1:}$$

$$\epsilon_1 = \Delta L_1/L_{10} = 2s[\sin(\pi/4 - \Delta\theta_{design}/2 + \delta\theta) - \sin(\pi/4 - \Delta\theta_{design}/2)]/2s\sin(\pi/4 - \Delta\theta_{design}/2) \quad \text{Equation 2:}$$

Based on Equation (I) and Equation (II) above, the strain and stress models of the actuators 12, 12a and core cells 2 can be used to compute the actuator and antagonistic configuration stiffness. For a given input $\delta\square$, P and $\delta P$, the resultant stress and strain which an actuator 12, 12a exerts on a core cell 2 may be computed. When the actuator 12, 12a is placed into the core cells 2, the kinematic relationship for the strain 14 and the stress 15 generated by the actuator 12, 12a can be used to compute the effective actuation modulus which is a ratio of stress 14 to strain 15 when the core cells 2 are subjected to an angular perturbation at different pressurization levels of the actuator 12, 12a according to Equation (III) below:

$$E_{McKibben,1} = \sigma_{McKibben,1}/\delta_1, E_{McKibben,2} = \sigma_{McKibben,2}/\epsilon_2 \quad \text{Equation 3:}$$

If no additional core stiffness losses occur, the effective modulus of the antagonistic actuation setup may be determined by the two actuators 12, 12a contributing in parallel. Thus, the total effective modulus of both actuators 12, 12a may be expressed by Equation 4:

$$E_{actuator} = E_{McKibben,1} + E_{McKibben,2} \quad \text{Equation 4:}$$

The core members 3 of the core cells 2 may be tensioned with a pre-load. During cooperative actuation, contraction (and thus increased pressurization, $+\delta P$) of one actuator 12, 12a may be accompanied by the extension (and slight depressurization, $-\delta P$) of the second actuator 12, 12a. Thus, while the stiffness of each McKibben actuator 12, 12a may change during the simultaneous actuation, their stiffness changes may compensate each other and the effective stiffness may remain relatively constant given a bias pressurization, P. However, to slightly increase stiffness for a given bias pressurization, P, both actuators 12, 12a may slightly increase pressurization, $+\delta P$, to maintain the existing position. This may kinematically lock the nodes 5 at which the actuators 12, 12a are attached to the core members 3, increasing the existing actuator stiffness proportional to 2δP/P.

In some applications, the adaptive structural core 1 may be a part of a morphing panel structure 28 (FIG. 1) which is used in the fabrication of aircraft skins on the wings and other surfaces of an aircraft. The actuators 12, 12a may be attached to the core cells 2 of the adaptive structural core 1 in such a manner as to reinforce a compliant direction (or mechanism) of the morphing panel structure 28. Thus, when the actuators 12, 12a are activated in a cooperative manner 54 (such as push-pull 54), as shown in FIG. 4, each core cell 2 and therefore the adaptive structural core 1 may change shape, as indicated by the difference of the core cell 2 shown in solid and phantom lines. This may induce the desired morphological changes in the aircraft wing or other surface of the aircraft before, after or during flight. When the actuators 12, 12a are activated in an antagonistic manner (such as pull-pull 55), as shown in FIG. 5, the deformation mechanism 14, 15 is blocked due to the competing actions of the actuators 12, 12a, causing self-stress in the core members 3 and stiffening the adaptive structural core 1 and the aircraft wing or other surface of the aircraft before, after or during flight. The morphing panel structure 28 of which the adaptive structural core 1 is a part may be used in conjunction with tailored substructures, actuation schemes, sensory feedback and a control system to reversibly and controllably morph the aircraft wing to the desired shape. In some applications, the morphing panel structure 1 may be retained in the morphed configuration by locking the actuators 12, 12a in place and turning off the hydraulic pressure pumps (not shown) which provide hydraulic pressure to the actuators 12, 12a. In some applications, the hydraulic pressure pumps may remain on to maintain the application of hydraulic pressure to the actuators 12, 12a. The adaptive structural core 1 may be amenable to a variety of other aerospace applications including but not limited to winglets, flaps, bay doors, seals, resizable compartments and turbine inlet and outlet nozzles, as well as non-aerospace applications.

The advantages of the adaptive structural core 1 may address the needed stiffness for aerodynamic stability and low energy (and thus low actuation and power source mass) needed to control the structural displacement. Morphing aircraft may enhance flight control, endurance time and application versatility throughout the flight The thickness 17 (FIG. 1) of the adaptive structural core 1 may be a substantial fraction of the overall thickness 18 of the morphing panel structure 28, and may be between one and ten times the sandwich panel facesheet 29 thickness 19, typically between 0.02 inch and inches. Embedded actuators 12 may have a diameter or thickness 13 (FIG. 4) of between 0.01 inch and 1 inch and may have a length 13a (FIG. 5) short enough to fit inside each core cell 2. In some applications, the adaptive structural core 1 may be 0.10 inch and the actuators 12, 12a may be 0.04 inch in diameter 13. For the morphing wing application, the mass and thickness of the aircraft skin may be a small fraction of the overall component (e.g. wing) thickness. The cell size and repeat unit distance of the core may be on the same order as the core thickness, with reasonable limitations on the thickness to achieve sufficient shape fidelity as noted herein above.

FIGS. 8 and 9 illustrate a scaled-up unit cell 2 of the adaptive structural core 1 with antagonistic actuators 12, 12a and the associated stiffness constants (stiffness=Δforce 58/Δdisplacement 39). FIG. 8 is a line graph 60 which illustrates differential pressurization 61 of a first actuator 12 at 125 psi vs. pressurization 62 of a second actuator 12a at −10 psi, yielding a stiffness of 13.9 N/mm. FIG. 9 is a line graph 64 which illustrates differential pressurization 65 of a first actuator 12 at 125 psi vs. pressurization 66 of a second actuator 12a at 125 psi, yielding a stiffness of 19.4 N/mm.

Referring next to FIGS. 10 and 11, in-plane deformation capabilities of the morphing panel structure 28 in implementation of an illustrative embodiment of the adaptive structure core 1 are shown. FIG. 10 illustrates differential in-plane global twisting deformation capability 68 of the morphing panel structure 28. With the compliant axes of the structure 28 oriented at a positive (counterclockwise) 71 and a negative (clockwise) 72 angle with respect to the span axis 70, the reversible shear deformation design may permit wing twisting in a closed airfoil geometry 73 by differential deformation of the counterclockwise angle 71 with respect to the clockwise angle 72 around the entire closed geometry 73. This change in shape permits a resultant twist 68 about the span axis 70 as shown in FIG. 10. FIG. 11 illustrates differential in-plane shear deformation capability 76 of the structure 28. When the differential deformation 76 occurs symmetrically between the top 77 and bottom 78 of the structure 28, a sweep change 79 and a corresponding fractional change in chord and span may occur. Aspect ratio (chord/camber change or area change) in planform may be accomplished with the shearing deformation design 76 by having the differential deformation described above be mirror symmetric with respect to the area change plane 80.

Figure 13:
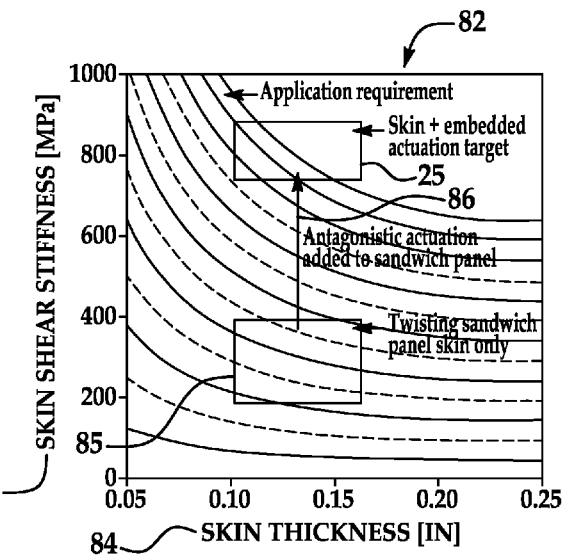
FIG. 13 is an illustration of a contour plot of the effective semi-span torsional stiffness, GJ, as a function of effective aircraft skin elastic modulus and aircraft skin thickness.

Referring next to FIGS. 12 and 13, in some applications the adaptive structural core 1 may be utilized in the wing skin 25 of an aircraft 24. FIG. 13 is a contour plot 82 of the effective span torsional stiffness, GJ, as a function of skin shear stiffness 83 and skin thickness 84 of the wing skin 25 which utilizes the adaptive structural core 1 in FIG. 12. The study application requirement is 594 Pa-m4. By combining the twisting characteristics of the sandwich panel structure 85 of the aircraft skin 25 with antagonistic actuation 86 in the adaptive structural core 1, the torsional stiffness in the wing skin 25 may be met.

The adaptive structural core 1 may be fabricated by assembling the core members 3 into a rhombus geometry core cell 2 with two actuators 12, 12a inside each core cell 2. With an attached fluidic distribution manifold (not shown), the actuators 12, 12a in both orientations may be pressurized using a pneumatic or hydraulic system. The number of independent planar degrees of freedom may depend directly on the number of independent pneumatic or hydraulic circuits formed. In some applications, a minimum of two independent pneumatic or hydraulic circuits may be required to engage the antagonistic actuation mode needed for shear actuation control or stiffness enhancement. More than two independent pneumatic or hydraulic circuits may add reliability, redundancy, planar zones for different spatial degrees of freedom but may require more sophisticated (and bulky) hardware and software. With both pneumatic or hydraulic circuits pressurized and when a shear deformation is desired, cooperative actuation may be achieved by depressurizing one actuator slightly while increasing pressure in the other actuator slightly. For an added stiffening effect, both actuators 12, 12a may not be differentially pressurized but caused to maintain or increase their respective pressures such that no shear displacement or deformation occurs. This may place additional compressive forces on the core members 3, increasing the strength and stiffness of the adaptive structural core 1. This form of antagonistic operation may cinch the rhombus-shaped repeat unit core cell 2. Sensors (not shown) may be required to validate the shear deformation, cinching operations and to provide a feedback signal for a software control system.

Two different actuator control signal circuits may be connected to the core members 3 such that, when activated, the core cell 2 is statically indeterminant (there is a state of self-stress in all the core members 3). The control signal may be provided via electrical or fluidic conduits such as manifolds and valving or electronic flex circuitry bonded to the core members 3. Sensors may be pressure sensors, load cells, displacement or angle sensors or linear or angular potentiometers.

Figure 14:
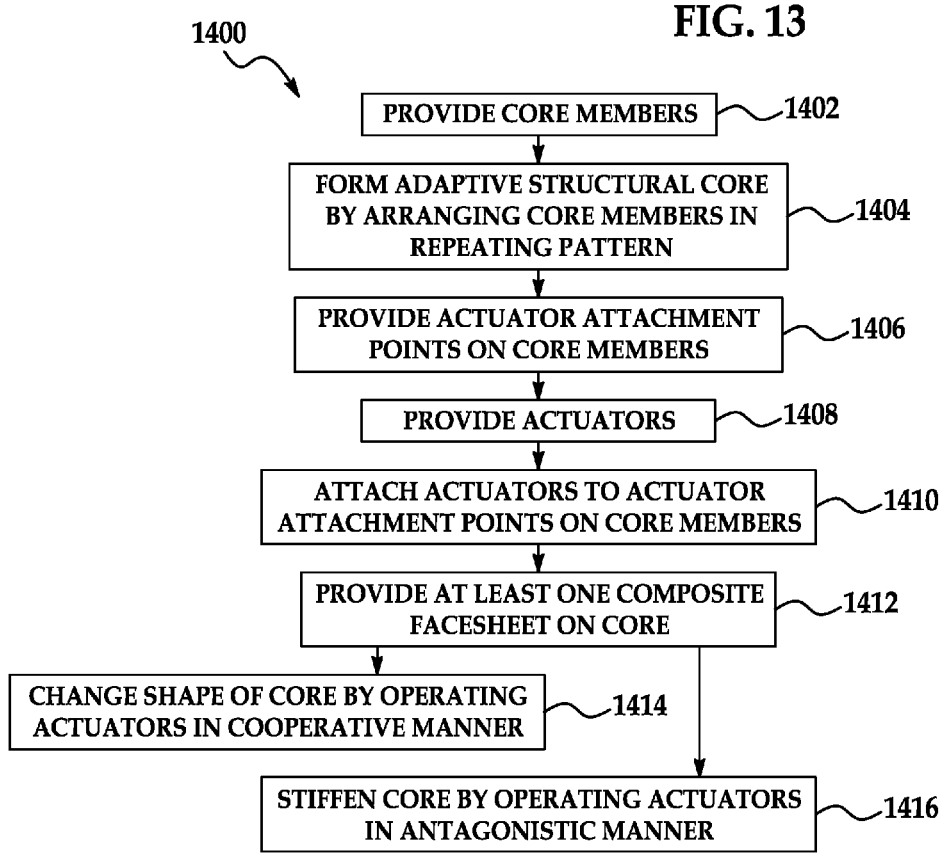
FIG. 14 is an illustration of a flow diagram of an embodiment of an adaptive structural core method.

Referring next to FIG. 14, a flow diagram 1400 of an illustrative embodiment of an adaptive structural core method is shown. In FIG. 1402, core members 3 are provided. In block 1404, an adaptive structural core 1 is formed by arranging the core members 3 in a repeating pattern. In block 1406, actuator attachment points 8 are provided on the core members 3. In block 1408, actuators 12, 12a are provided. In block 1410, the actuators 12, 12a are attached to the actuator attachment points 8 on the core members 3. In block 1412, at least one composite facesheet 29 is provided on the adaptive structural core 1. In block 1414, in some applications the shape of the core 1 may be changed by operating the actuators 12 in a cooperative manner 54. In block 1416, in some applications the core 1 may be stiffened by operating the actuators 12, 12a in an antagonistic manner 55. In some aerospace applications, an aircraft operator may choose a morphing shape for the wing skin 25 (FIG. 12) which utilizes the core 1. The aircraft operator may operate the actuators 12, 12a in each core cell 2 of the core 1 to change the shape of each core cell 2, as was heretofore described with respect to FIG. 4. The core 1 may change or morph the shape of the wing skin 25. Provision may be made for the aircraft operator to confirm whether the selected shape for the wing skin 25 conforms to the shape which was selected by the aircraft operator.

Figure 14A:
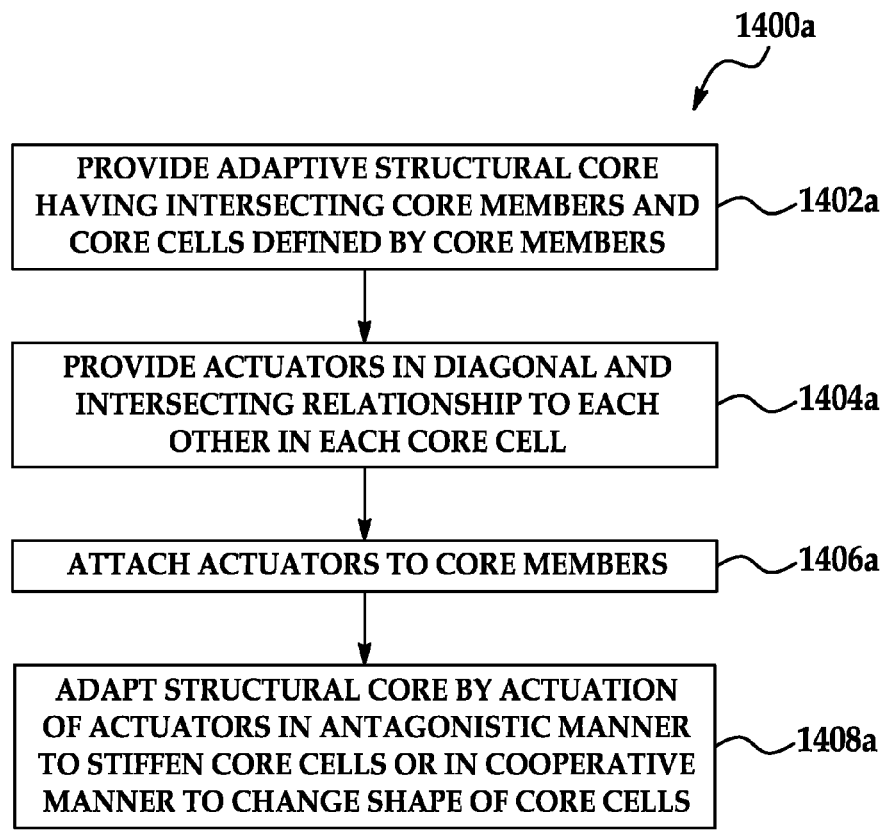
FIG. 14A is an illustration of a flow diagram of a method of adapting a structural core of a morphing panel structure.

Referring next to FIG. 14A, a flow diagram 1400a which illustrates a method of adapting a structural core of a morphing panel structure is shown. In block 1402a, an adaptive structural core 1 having intersecting core members 3 and core cells 2 defined by the core members 3 may be provided. In block 1404a, at least one actuator 12, 12a may be provided in each core cell 2. In some embodiments, a pair of actuators 12, 12a may be provided in diagonal and intersecting relationship with respect to each other in each core cell 2. In block 1406a, the actuators 12, 12a may be attached to the core members 3. In block 1408a, the structural core 1 may be adapted by actuation 54, 55 of the actuators 12, 12a. The actuators 12, 12a may be actuated in an antagonistic manner 55 to stiffen the core cells 2. The actuators 12, 12a may be actuated in a cooperative manner 54 to change the shape of the core cells 2.

Figure 15:
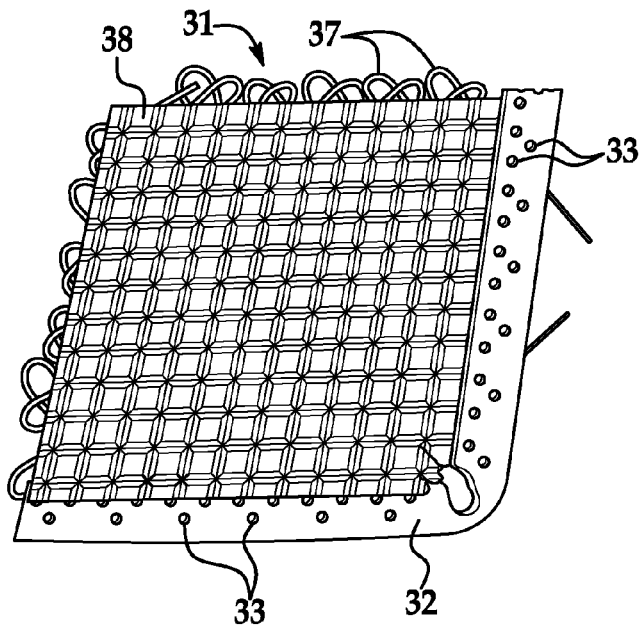
FIG. 15 is an illustration of a perspective view of a morphing panel structure.
Figure 16:
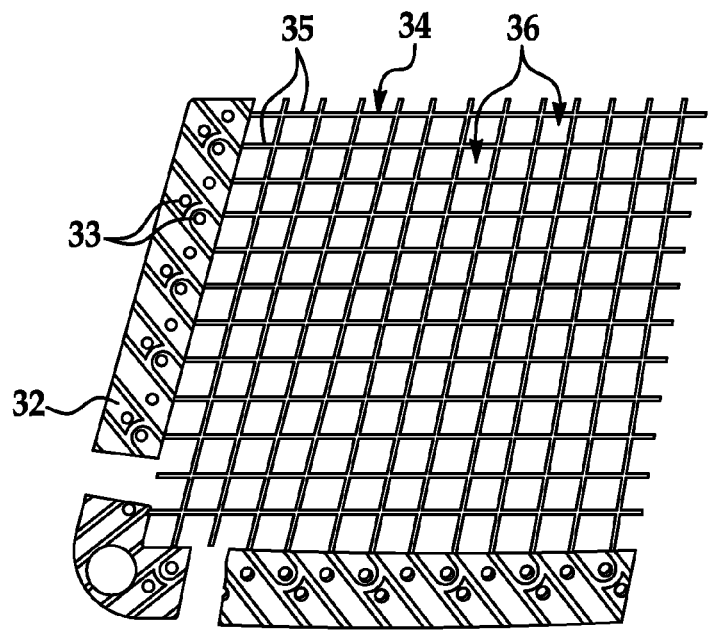
FIG. 16 is an illustration of a perspective view, partially in section, of an adaptive structural core which is suitable for the morphing panel structure shown in FIG. 15.
Figure 17:
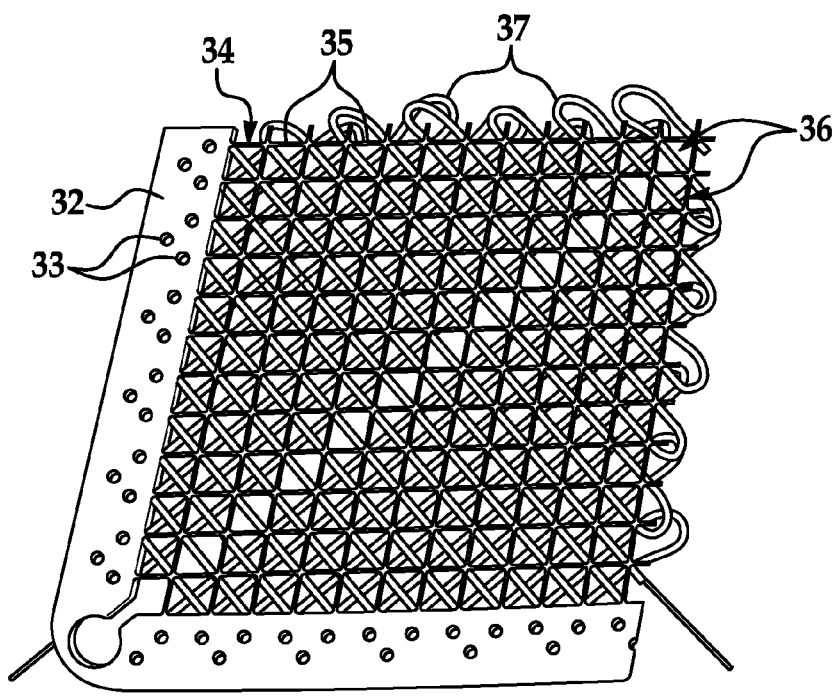
FIG. 17 is an illustration of a perspective view of the adaptive structural core with McKibben actuators provided in the core cells of the adaptive structural core shown in FIG. 16.

Referring next to FIGS. 15-17, an illustrative morphing panel structure 31 is shown in FIG. 15. The morphing panel structure 31 may include an adaptive structural core 34 which is shown in FIG. 16. The adaptive structural core 34 may include a network of intersecting core members 35 defining multiple rows and columns of core cells 36. The adaptive structural core 34 may be mounted in a core frame 32 which may be fitted with frame mount openings 33 to facilitate attachment of the core frame 32 to a structure (not shown) using bolts or other fasteners (not shown). Two sets of McKibben actuators 37 may extend diagonally through each core cell 36 of the adaptive structural core 34 in intersecting relationship with respect to each other. In some embodiments, each McKibben actuator 37 may be continuous across multiple core cells 36, as shown in FIG. 17. As shown in FIG. 15, a composite facesheet 38 may be provided on at least one surface of the adaptive structural core 34. In some embodiments, the adaptive structural core 34 may be sandwiched between a pair of composite facesheets 38 provided on opposite surfaces of the adaptive structural core 34.

Figure 18:
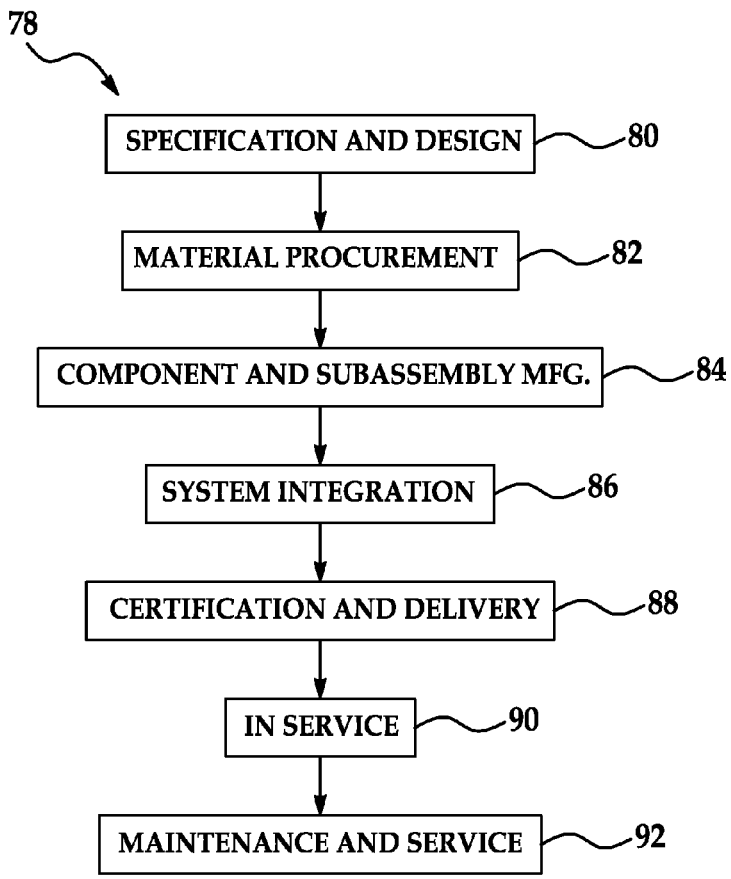
FIG. 18 is an illustration of a flow diagram of an aircraft production and service methodology.
Figure 19:
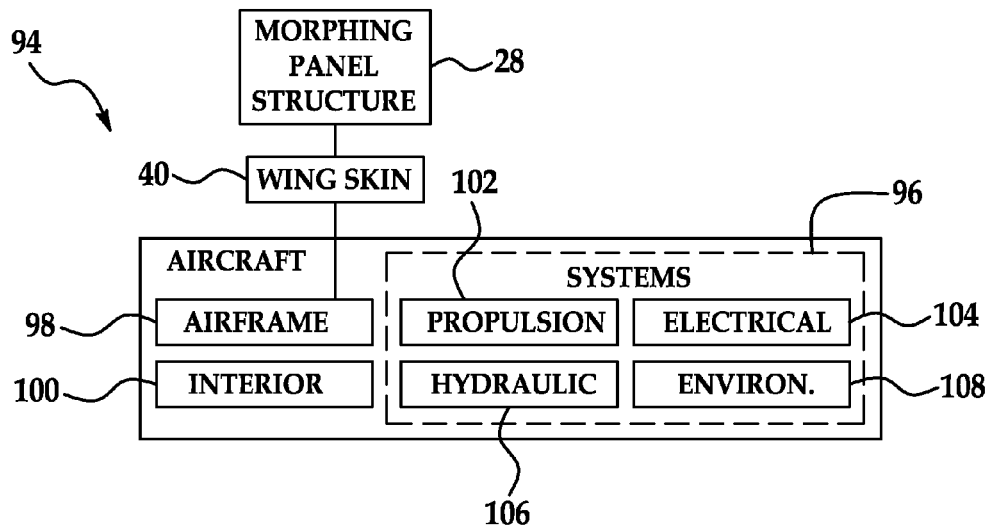
FIG. 19 is an illustration of a block diagram of an aircraft.

Referring next to FIGS. 18 and 19, embodiments of the disclosure may be used in the context of an aircraft manufacturing and service method 78 as shown in FIG. 18 and an aircraft 94 as shown in FIG. 19. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 19, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry. A wing skin 40 may be provided on the airframe 98. At least one morphing panel structure 28 may be incorporated into the wing skin 40.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A morphing sandwich panel structure of an aircraft skin, the morphing sandwich panel structure comprising:
   a pair of composite facesheets, a first composite facesheet of the pair of composite facesheets forming an outer surface of the aircraft skin;
   an adaptive structural core sandwiched between the pair of composite facesheets, the adaptive structural core comprising:
   a plurality of core members arranged to define a repeating pattern of core cells in the morphing panel structure, the core cells arranged in at least two columns and at least two rows;
   a plurality of actuator attachment points provided on the plurality of core members; and an actuator engaging a first actuator attachment point and a second actuator attachment point of the plurality of actuator attachment points.

2. The morphing sandwich panel structure of claim 1 wherein the morphing panel structure comprises a planar repeat unit structure of the core cells.

3. The morphing sandwich panel structure of claim 2 wherein the planar repeat unit structure comprises a rhombus geometry.

4. The morphing sandwich panel structure of claim 2 wherein the planar repeat unit structure comprises a parallelogram geometry.

5. The morphing sandwich panel structure of claim 2 further comprising a plurality of actuators attached to opposing ones of the plurality of actuator attachment points within each of the core cells.

6. The morphing sandwich panel structure of claim 2 wherein core cell size and repeat unit distance of the core are on a same order as core thickness.

7. The morphing sandwich panel structure of claim 1 wherein each of the plurality of actuator attachment points comprises an actuator attachment opening.

8. The morphing sandwich panel structure of claim 1 wherein the plurality of core members comprises a plurality of metal core members.

9. The morphing sandwich panel structure of claim 1 wherein the plurality of core members comprises a plurality of composite core members.

10. The morphing sandwich panel structure of claim 1 wherein the plurality of core members are a monolith.

11. The morphing sandwich panel structure of claim 1 wherein the actuator is continuous within a number of core cells in the core cells.

12. The morphing sandwich panel structure of claim 1 wherein the actuator is discrete over a single core cell in the core cells.

13. The morphing sandwich panel structure of claim 1 wherein the actuator comprises a McKibben actuator.

14. The morphing sandwich panel structure of claim 1 wherein the adaptive structural core has a thickness between 0.02 inches and 4 inches.

15. A morphing sandwich panel structure of an aircraft skin, the morphing sandwich panel structure comprising:
    a pair of composite facesheets, a first composite facesheet of the pair of composite facesheets forming an outer surface of the aircraft skin;
    an adaptive structural core sandwiched between the pair of composite facesheets, the adaptive structural core comprising:
        a plurality of core members arranged to define a repeating pattern of core cells in the morphing panel structure, the core cells arranged in at least two columns and at least two rows;
        a plurality of actuator attachment points provided on intersections of the plurality of core members in the core cells;
        a plurality of actuators attached to the plurality of actuator attachment points.

16. The morphing sandwich panel structure of claim 15 wherein the plurality of actuators comprises two actuators in each core cell, the two actuators in diagonal and intersecting relationship with respect to each other in each core cell.

17. The morphing sandwich panel structure of claim 15 wherein the plurality of actuators comprises one actuator in each core cell.

18. The morphing sandwich panel structure of claim 15 wherein the plurality of actuators are configured in relation to the plurality of core members to allow deformation in-plane of the repeating pattern, wherein the plurality of actuators are configured in relation to the plurality of core members to resist out-of-plane bending or flexing deformation.

19. An adaptive structural core method of a morphing sandwich panel structure of an aircraft skin, the method comprising:
    providing a plurality of core members;
    arranging the plurality of core members to define a repeating pattern of core cells in the morphing panel structure, the core cells arranged in at least two columns and at least two rows; and
    providing a plurality of actuator attachment points on the plurality of core members;
    providing a pair of composite facesheets in-plane with the repeating pattern and attached to at least one core member of the plurality of core member, the plurality of core members sandwiched between the pair of composite facesheets, a first composite facesheet of the pair of composite facesheets forming an outer surface of the aircraft skin.

20. The method of claim 19 wherein providing a plurality of actuator attachment points on the plurality of core members comprises providing attachment points on intersections of the plurality of core members in the core cells.

21. The method of claim 20 further comprising providing a pair of actuators in each core cell of the of core cells and attaching the pair of actuators to the attachment points, wherein the pair of actuators are positioned in diagonal relationship with respect to each other in each core cell of the core cells.

22. A morphing sandwich panel structure of an aircraft skin, the morphing sandwich panel structure comprising:
    a pair of composite facesheets, a first composite facesheet of the pair of composite facesheets forming an outer surface of the aircraft skin;
    an adaptive structural core sandwiched between the pair of composite facesheets, the adaptive structural core comprising:
        a plurality of intersecting core members arranged to define a planar repeat pattern of core cells in the morphing panel structure, each core cell of the core cells having a cell space and a plurality of cell walls facing the cell space, the core cells arranged in at least two rows and at least two columns;
        a plurality of actuator attachment points provided in the plurality of core members in the cell space;
        a first actuator provided diagonally in the cell space and engaging a first pair of the plurality of actuator attachment points;
        a second actuator provided diagonally in the cell space and engaging a second pair of the plurality of actuator attachment points; and
        the first actuator and the second actuator configured to exert forces on the cell walls in a selected one of a cooperative manner and an antagonistic manner.

23. An adaptive structural core method of a morphing sandwich panel structure of an aircraft skin, the method comprising:
    providing a plurality of core members;
    forming a plurality of core cells in the morphing panel structure by arranging the plurality of core members in a repeating pattern;
    providing a plurality of actuator attachment points on the plurality of core members, within the plurality of core cells;
    providing a plurality of actuators;

attaching the actuators to the actuator attachment points;

providing a pair of composite facesheets in-plane with the repeating pattern, and attached to at least one core member of the plurality of core members, the plurality of core members sandwiched between the pair of composite facesheets, a first composite facesheet of the pair of composite facesheets forming an outer surface of the aircraft skin;

actuating the plurality of actuators to perform at least one of: changing a shape of adaptive structural core by operating the plurality of actuators in a cooperative manner and stiffening the adaptive structural core by operating the plurality of actuators in an antagonistic manner.

24. A method of adapting a structural core of a morphing sandwich panel structure of an aircraft skin, the method comprising:

providing an adaptive structural core having a plurality of core cells arranged in at least two rows and at least two columns;

providing at least two actuators in the adaptive structural core;

providing a pair of composite facesheets in-plane with the adaptive structural core, the plurality of core members sandwiched between the pair of composite facesheets, a first composite facesheet of the pair of composite facesheets forming an outer surface of the aircraft skin; and actuating the at least two actuators.

25. The method of claim 24 wherein actuating the at least two actuators comprises actuating the at least two actuators in an antagonistic manner, wherein actuation stiffens the plurality of core cells.

26. The method of claim 24 actuating the at least two actuators comprises actuating the at least two actuators in a cooperative manner, wherein actuation changes a shape of the plurality of core cells.

27. The method of claim 24 wherein providing the adaptive structural core having the plurality of core cells comprises providing a plurality of intersecting core members in a repeating pattern, wherein the plurality of intersecting core members define the plurality of core cells.

28. The method of claim 24 wherein providing at least two actuators in the adaptive structural core comprises providing a pair of actuators in diagonal and intersecting relationship with respect to each other in each of the plurality of core cells.

* * * * *